(12) United States Patent
Newman et al.

(10) Patent No.: US 10,506,436 B1
(45) Date of Patent: Dec. 10, 2019

(54) LATTICE MESH

(71) Applicant: Anduril Industries Inc., Irvine, CA (US)

(72) Inventors: Jared Newman, Costa Mesa, CA (US); Ryan Brown, Irvine, CA (US); Brian W. Schimpf, Palo Alto, CA (US); Palmer F. Luckey, Newport Beach, CA (US); Julian Hammerstein, Murrieta, CA (US); Travis M. Whitaker, Costa Mesa, CA (US); Jason Levin, Costa Mesa, CA (US); Joseph Chen, Irvine, CA (US)

(73) Assignee: Anduril Industries Inc., Irvine, CA (US)

( * ) Notice: Subject to any disclaimer, the term of this patent is extended or adjusted under 35 U.S.C. 154(b) by 0 days.

(21) Appl. No.: 16/201,873

(22) Filed: Nov. 27, 2018

Related U.S. Application Data

(60) Provisional application No. 62/683,533, filed on Jun. 11, 2018.

(51) Int. Cl.
| | |
|---|---|
| *H04M 1/66* | (2006.01) |
| *H04W 12/06* | (2009.01) |
| *H04W 12/04* | (2009.01) |
| *H04W 12/00* | (2009.01) |
| *H04L 29/06* | (2006.01) |
| *H04L 9/08* | (2006.01) |
| *H04L 29/08* | (2006.01) |

(52) U.S. Cl.
CPC ....... *H04W 12/0609* (2019.01); *H04L 9/0825* (2013.01); *H04L 9/0833* (2013.01); *H04L 9/0894* (2013.01); *H04L 63/0823* (2013.01); *H04L 67/12* (2013.01); *H04W 12/009* (2019.01); *H04W 12/04031* (2019.01); *H04W 12/04033* (2019.01); *H04L 2209/12* (2013.01); *H04L 2209/80* (2013.01)

(58) Field of Classification Search
None
See application file for complete search history.

(56) References Cited

U.S. PATENT DOCUMENTS

| | | |
|---|---|---|
| 2006/0092861 A1 | 5/2006 | Cordray |
| 2010/0161998 A1 | 6/2010 | Chen |
| 2016/0007192 A1 | 1/2016 | Huang |
| 2016/0134585 A1 | 5/2016 | Falk |
| 2018/0007557 A1* | 1/2018 | Lee .......... H04W 4/70 |
| 2018/0239897 A1* | 8/2018 | Ventura .......... G06F 21/53 |

\* cited by examiner

*Primary Examiner* — Erika A Washington
(74) *Attorney, Agent, or Firm* — Van Pelt, Yi & James LLP

(57) ABSTRACT

A system for a lattice mesh comprises an interface and a processor. The interface is configured to receive a request to register from a host, wherein the request to register includes a key and a set of asset IDs that the host wishes to claim. The processor is configured to sign the key to generate a resource authority (RA) certificate signed key with an RA certificate; update an asset database with the RA certificate signed key; distribute the RA certificate signed host public key through the network; and provide the host with the RA certificate signed key. In some embodiments, the system further comprises a memory that is coupled to the processor and configured to provide the processor with instructions.

21 Claims, 11 Drawing Sheets

LATTICE MESH

CROSS REFERENCE TO OTHER APPLICATIONS

This application claims priority to U.S. Provisional Patent Application No. 62/683,533 entitled AUTONOMOUS SENSOR SYSTEM ARCHITECTURE AND INTERFACE filed Jun. 11, 2018 which is incorporated herein by reference for all purposes.

BACKGROUND OF THE INVENTION

Networks of devices typically are thought of as secure and not vulnerable to attack by corruption of a given node. However, in this case once a node is compromised, the node is then a problem for network security as the node is able to spy on the data traffic through the node and other information stored on the node. In addition, networks are also typically designed to provide stable communication leading to a problem that network traffic is lost or not conveyed.

BRIEF DESCRIPTION OF THE DRAWINGS

Various embodiments of the invention are disclosed in the following detailed description and the accompanying drawings.

DETAILED DESCRIPTION

Figure 1:
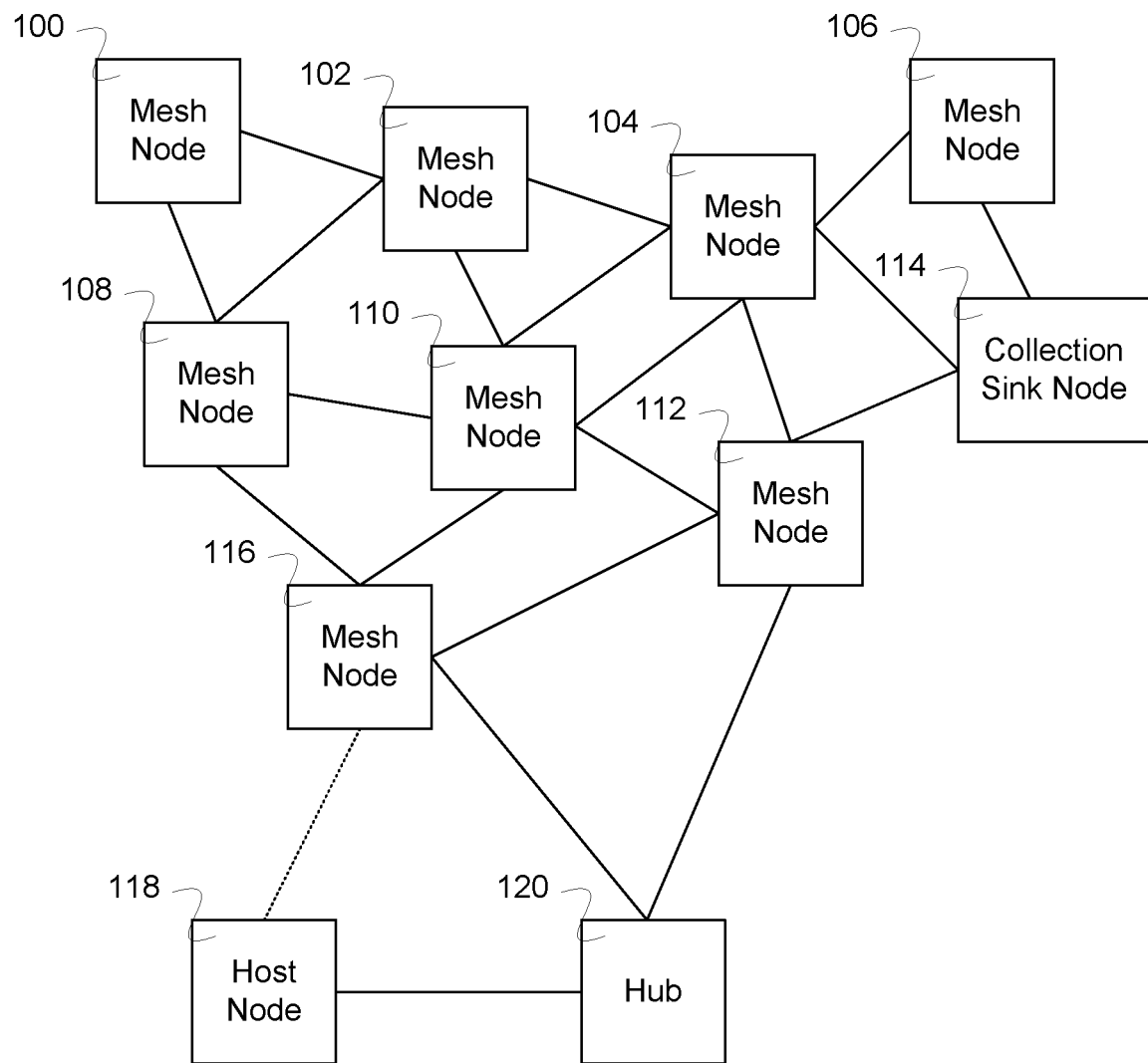
FIG. 1 is a block diagram illustrating an embodiment of a mesh network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a lattice mesh is disclosed. The system comprises an interface and a processor. The interface is configured to receive a request to register from a host, wherein the request to register includes a key and a set of asset IDs that the host wishes to claim. The processor is configured to sign the key to generate a resource authority (RA) certificate signed key with an RA certificate; update an asset database with the RA certificate signed key; distribute the RA certificate signed host public key through the network; and provide the host with the RA certificate signed key. In some embodiments, the system further comprises a memory that is coupled to the processor and configured to provide the processor with instructions.

The system for a lattice mesh includes a secure mechanism for communication within the lattice mesh. Communication between nodes is enabled for messages that have a targeted destination both in a point to point mode and a publication mechanism where a message can be targeted at multiple destinations. The security for the communications is designed to prevent compromised nodes from being used to acquire significant message traffic from the network once the node is compromised. In addition, the network prioritizes real time data despite variable performance of network links. The network also ensures security by establishing secure routing using point to point authorizations. The network also strategically caches data flowing in the network so that when channels are available data can be sent.

The lattice mesh is an improvement over other networks by improved security. The network is designed to overcome unstable communication links and the potential for nodes becoming compromised. The lattice mesh overcomes the potential issues using security systems that secure messages, secure routes, and secure backfilling of messages that wait to be sent through the network.

FIG. 1 is a block diagram illustrating an embodiment of a mesh network. In the example shown, a mesh network includes multiple nodes (e.g., mesh node 100, mesh node 102, mesh node 104, mesh node 106, mesh node 108, mesh node 108, mesh node 110, mesh node 112, collection sink node 114, mesh node 116, etc.). Host node 118 comprises a new device or sensor or tower that is requesting to join the mesh network. Host node 118 discovers mesh node 116 and requests to join the network. Either the mesh network informs host node 118 of the hub address or host node 118 has the hub address pre-loaded. Host node 118 contacts hub 120 to register with a resource authority that runs on hub 120. Collection sink node 114 comprises a mesh node that includes a backfill database. The backfill database stores data that is transiting the network and stores it in case the transmissions are not able to be completed. The backfill database acts as a repository for being able to later provide data between nodes.

Figure 2:
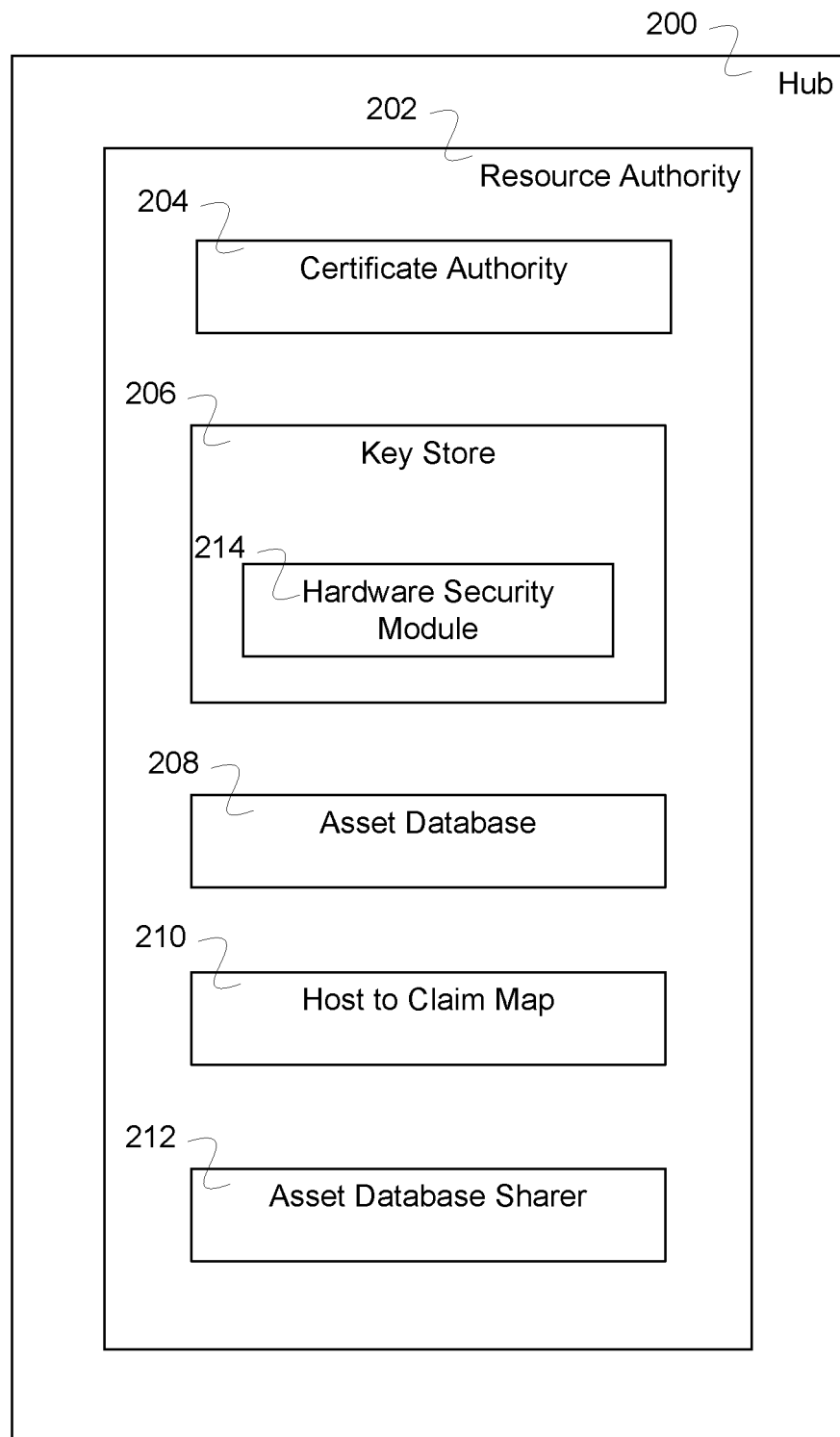
FIG. 2 is a block diagram illustrating an embodiment of a hub.

FIG. 2 is a block diagram illustrating an embodiment of a hub. In some embodiments, the hub of FIG. 2 is used to implement hub 120 of FIG. 1. In the example shown, hub 200 includes resource authority 202. Resource authority (RA) 202 includes certificate authority (CA) 204, key store 206, asset database (DB) 208, host to claim map 210, and asset database sharer 212. Resource authority 202 runs on hub 200. In some embodiments, hub 200 runs on a central cloud based server or virtual machine. CA 204 acts as a certificate authority for the system and responds to registration requests by new devices. CA 204 also allows services to authenticate a device and verify whether the device is allowed on the system's mesh network. CA 204 can be self-signed or have trust delegated to it from a higher level certificate authority. Key store 206 holds public keys of hosts allowed on the network and assigning them unique numeric hostIDs. In some embodiments, key store 206 uses a hardware security module (HSM) 214 to prevent software based compromises of key material as well as provide tamper-resistance for physically compromised nodes. In some embodiments, for RA 202, a cloud-based HSM can be used to store keys and sign new asset DBs and host certificates. Asset DB 208 stores a mapping of hosts (e.g., hostPublicKey to hostIDs to a list of assetIDs). Asset DB 208 is also used to ensure that assetIDs are unique for the entire system. In some cases, asset DB 208 is referred to as the host map.

In some embodiments, asset DB 208 includes a signed monotonically increasing version number, which can be used to securely determine whether to use a neighbor's asset DB. For example, a host can inquire to neighbors what the version number of their asset DB is greater than the version number that they have. In response to a neighbor having a greater version number of the asset DB, the host node can cause the transfer of the asset DB from the neighbor to itself and store the higher version number asset DB in place of the current lower version asset DB currently stored in the host node.

The mappings of hostPublicKey->(hostID, [assetID]) are signed by RA 202 and used throughout the system for naming and addressing purposes. Host to claim map 210 includes a mapping between hosts and claims that the hosts can make. Asset database sharer 212 is used to securely distribute or gossip the asset DB to other nodes in the system so that host map is available even if a wireless communication link (e.g., an LTE, cellular, WiFi, etc.) to a central hub is unavailable.

Figure 3A:
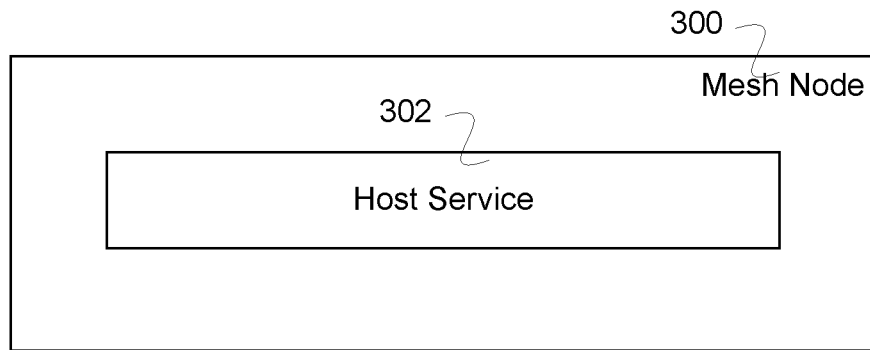
FIG. 3A is a block diagram illustrating an embodiment of a mesh node.

FIG. 3A is a block diagram illustrating an embodiment of a mesh node. In some embodiments, mesh node 300 is used to implement a mesh node in FIG. 1 (e.g., mesh node 100, mesh node 102, mesh node 104, mesh node 106, mesh node 108, mesh node 110, mesh node 112, collection sink node 114, and mesh node 116). In the example shown, mesh node 300 may comprises a drone, an observation station (e.g., a tower), a small autonomous sensor (e.g., a sensor, a 'dust' sensor, etc.), a helicopter, or any other appropriate member of a mesh network. Mesh node 300 includes host service 302. Host service 302 runs on mesh node 300, using a processor, and handles a routing gossip service that distributes the RA's asset DB as well as host-signed assertions about network reachability and service discovery information. Host service 302 also publishes and subscribes to latency-sensitive, time-ordered message streams (including video data) from different types of assets (e.g., other mesh nodes on the mesh network, nodes on a subnetwork, etc.). Host service 302 runs a single network service and has a unique private/public key pair that identifies it. The RA assigns a unique numeric hostID for each allowed public key. Mesh node 300 may run one or more assets that are locally connected to mesh node 300, where mesh node 300 maintains a locally-routable connection (e.g., over localhost or another local subnet) to a publish/subscribe and HTTP/2 proxy to make publish/subscribe requests and perform secure remote procedure call(s) (RPC(s)). An asset has an associated assetID and a set of assetTraits (e.g., a drone, an unattended ground sensor (UGS), a tower, etc.). Each assetTrait corresponds to a list of provided RPC services and produced publish/subscribe topic names.

Figure 3B:
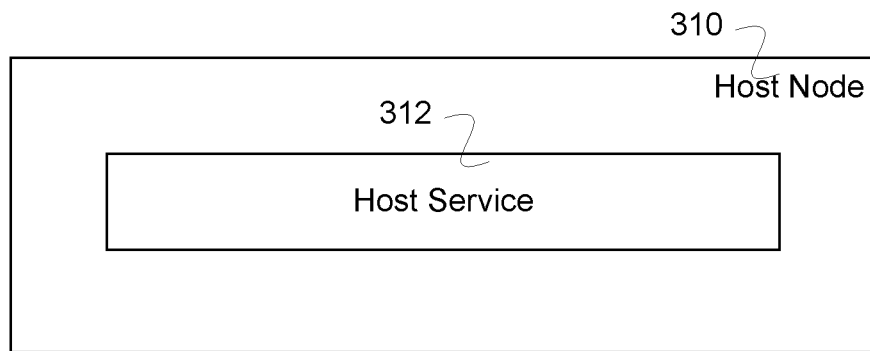
FIG. 3B is a block diagram illustrating an embodiment of a host node.

FIG. 3B is a block diagram illustrating an embodiment of a host node. In some embodiments, host node 310 is used to implement host node 118 in FIG. 1. In the example shown, host node 310 is a node that is trying to join the mesh network to become a mesh node and may comprises a drone, an observation station (e.g., a tower), a small autonomous sensor (e.g., a sensor, a 'dust' sensor, etc.), a helicopter, or any other appropriate member of a mesh network. Host node 310 includes host service 312. Host service 312 runs on host node 310, using a processor, and handles a routing gossip service that distributes the RA's asset DB as well as host-signed assertions about network reachability and service discovery information. Host service 312 also publishes and subscribes to latency-sensitive, time-ordered message streams (including video data) from different types of assets (e.g., other mesh nodes on the mesh network, nodes on a subnetwork, etc.). Host service 312 runs a single network service and has a unique private/public key pair that identifies it. The RA assigns a unique numeric hostID for each allowed public key. Host node 310 may run one or more assets that are locally connected to host node 310, where host node 310 maintains a locally-routable connection (e.g., over localhost or another local subnet) to a publish/subscribe and HTTP/2 proxy to make publish/subscribe requests and perform secure remote procedure call(s) (RPC(s)). An asset has an associated assetID and a set of assetTraits (e.g., a drone, a UGS, a tower, etc.). Each assetTrait corresponds to a list of provided RPC services and produced publish/subscribe topic names.

Figure 3C:
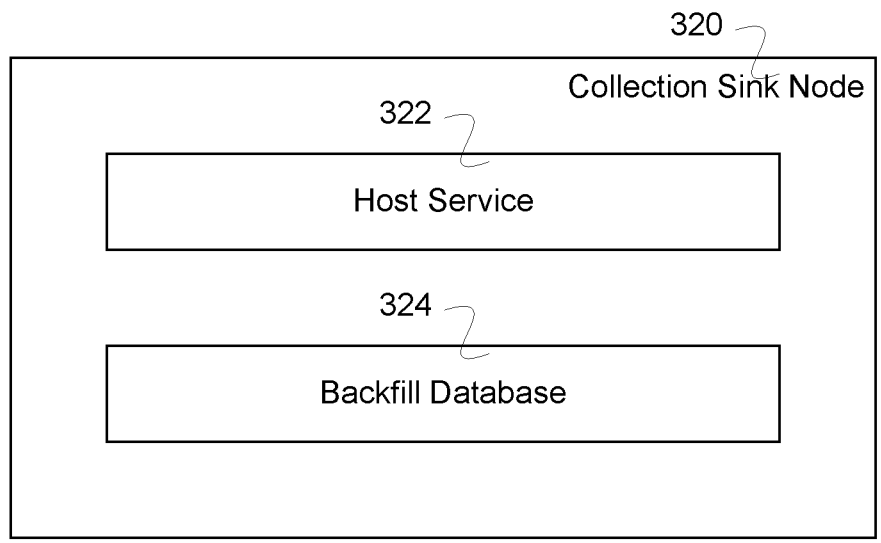
FIG. 3C is a block diagram illustrating an embodiment of a collection sink node.

FIG. 3C is a block diagram illustrating an embodiment of a collection sink node. In some embodiments, host node 320 is used to implement collection sink node 114 in FIG. 1. In the example shown, host node 310 is a node that is trying to join the mesh network to become a mesh node and may comprise a drone, an observation station (e.g., a tower), a small autonomous sensor (e.g., a sensor, a 'dust' sensor, etc.), a helicopter, or any other appropriate member of a mesh network. Host node 310 includes host service 312. Host service 312 runs on host node 310, using a processor, and handles a routing gossip service that distributes the RA's asset DB as well as host-signed assertions about network reachability and service discovery information. Host service 312 also publishes and subscribes to latency-sensitive, time-ordered message streams (including video data) from different types of assets (e.g., other mesh nodes on the mesh network, nodes on a subnetwork, etc.). Host service 312 runs a single network service and has a unique private/public key pair that identifies it. The RA assigns a unique numeric hostID for each allowed public key. Host node 310 may run one or more assets that are locally connected to host node 310, where host node 310 maintains a locally-routable connection (e.g., over localhost or another local subnet) to a publish/subscribe and HTTP/2 proxy to make publish/subscribe requests and perform secure remote procedure call(s) (RPC(s)). An asset has an associated assetID and a set of assetTraits (e.g., a drone, a UGS, a tower, etc.). Each assetTrait corresponds to a list of provided RPC services and produced publish/subscribe topic names.

Figure 3D:
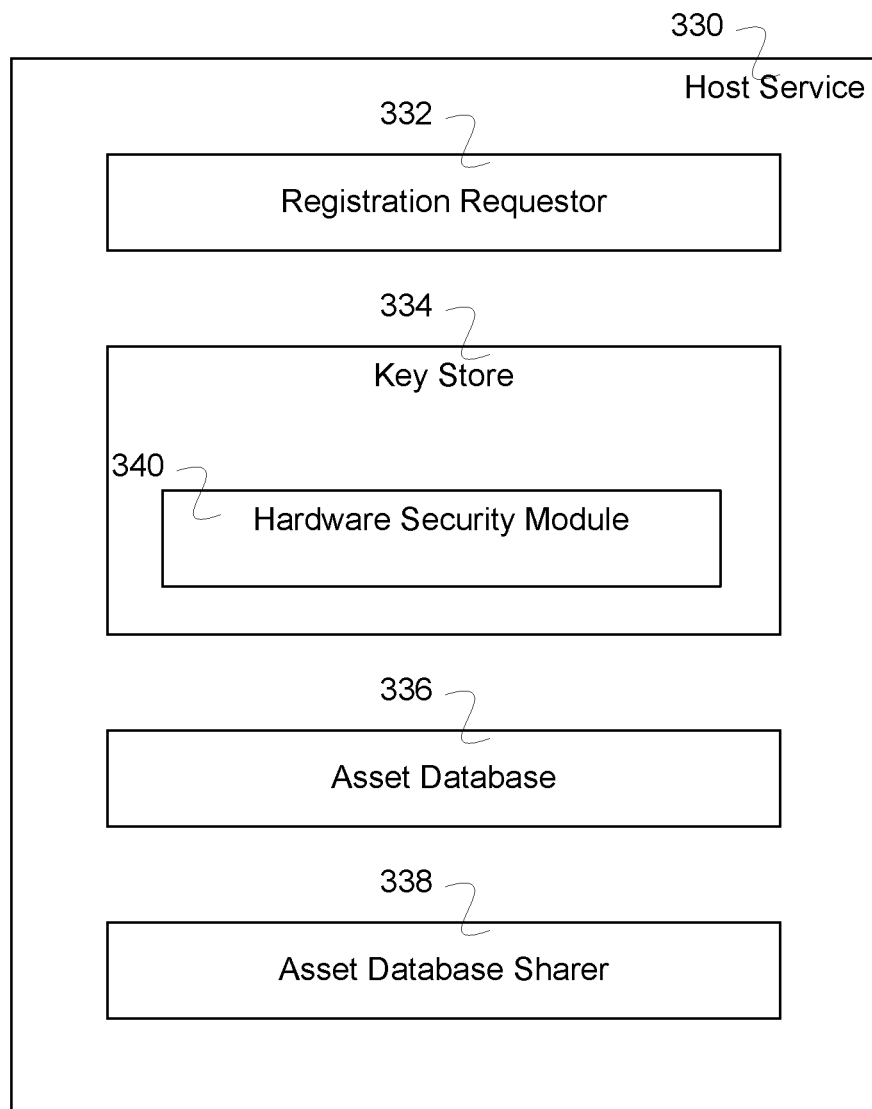
FIG. 3D is a block diagram illustrating an embodiment of a host service.

FIG. 3D is a block diagram illustrating an embodiment of a host service. In some embodiments, host service 330 is used to implement host service 302 of FIG. 3A or host service 312 of FIG. 3B or host service 322 of FIG. 3C. In the example shown, host service 330 includes registration requestor 332, key store 334, asset database 336, and asset database sharer 338. Registration requestor 332 can cause a request for registration to a mesh network in response to first discovering one or more local mesh nodes or in response to adding or deleting a new asset associated with the node that the host service is running on. In some embodiments, the RA public key is pre-pinned in each host enabling the host node to be able to identify the appropriate RA for registration. Key store 334 holds private keys of hosts allowed on the network and assigning each host a unique numeric hostID. In some embodiments, key store 334 uses a hardware security module (HSM) 340 to prevent software based compromises of key material as well as provide tamper-resistance for physically compromised nodes. In some embodiments, a removable HSM can be attached to a host node to store and distribute private key material and sign new host assertions. Asset DB 336 stores a mapping of hosts (e.g., hostPublicKey to hostIDs to a list of assetIDs). Asset DB 336 is also used to ensure that assetIDs are unique for the entire system. Asset DB 336 is referred to as the host map. The mappings of hostPublicKey->(hostID, [assetID]) are signed by an RA and used throughout the system for naming and addressing purposes. Asset database sharer 338 is used to securely distribute or gossip the asset DB to other nodes in the system so that host map is available even if a wireless communication link (e.g., an LTE, cellular, WiFi, etc.) to a central hub is unavailable. In some embodiments, asset DB sharer 338 is able to determine whether a neighbor node has a version of the asset DB that is newer than the current asset DB stored as part of host service 330.

Figure 4:
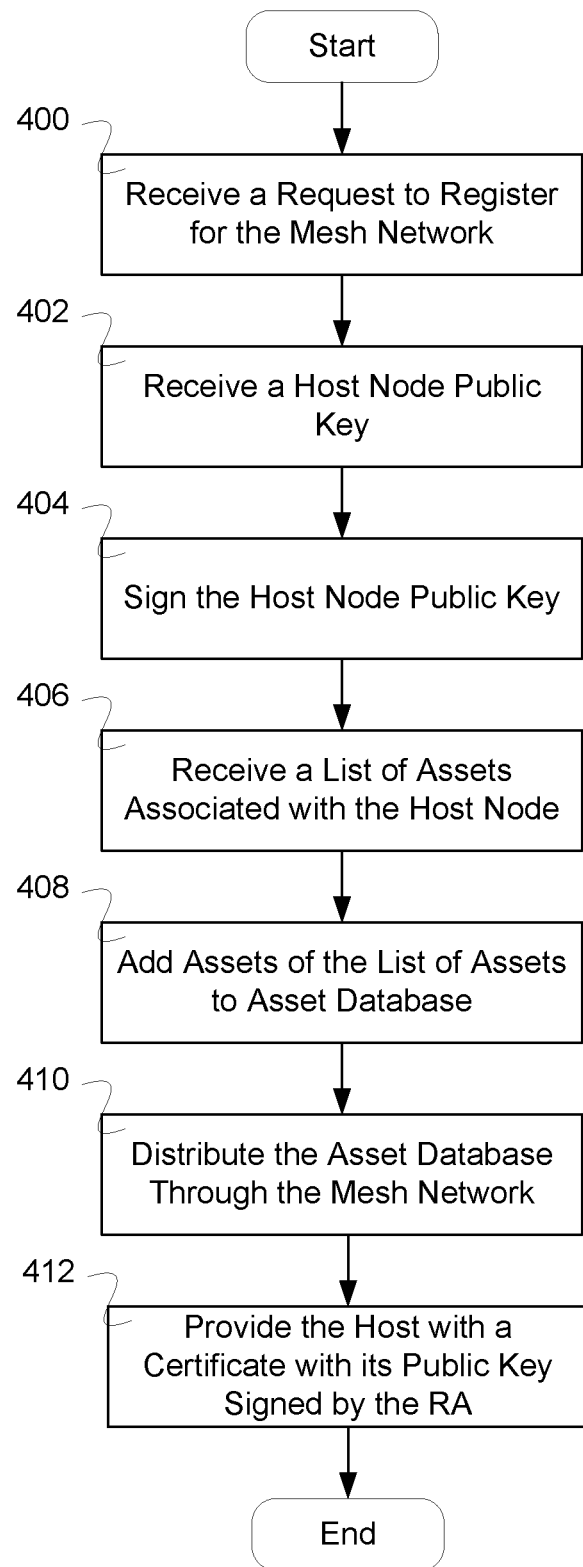
FIG. 4 is a flow diagram illustrating an embodiment of a registration process.

FIG. 4 is a flow diagram illustrating an embodiment of a registration process. In some embodiments, the process of FIG. 4 is used by a host node (e.g., host node 118 of FIG. 1) to register with a mesh network (e.g., a mesh network made up of a plurality of mesh nodes such as mesh nodes of FIG. 1—for example, mesh node 100, mesh node 102, mesh node 104, mesh node 106, mesh node 108, mesh node 110, mesh node 112, collection sink node 114, and mesh node 116). In some embodiments, in order to prevent an attacker adding rogue devices to the system or compromising a node and redirecting traffic from assets to the compromised node or between nodes, a host node must go through a registration process when requesting to join the mesh network. In the example shown, in 400 a request is received to register for the mesh network. For example, a resource authority (e.g., of a hub node) receives a request from a host node wishing to join the mesh network. In some embodiments, a host node discovers local nodes of a mesh network that it can identify; one or more of the local mesh nodes is used to convey a request to join the mesh network to an appropriate resource authority. In some embodiments, the registration process involves the host making a secure RPC to the RA with a request. In some embodiments, the request is triggered by the addition of a new asset to the host. In some embodiments, the request is triggered by the deletion of an asset to the host—for example, a host asset is removed (e.g., due to a software update, hardware update, an unplugging of the asset, etc.) or a user removes the asset remotely after being checked for the authority to remove the asset. Upon a change to the assets associated with a host, a new asset DB is distributed. In 402, a host node public key is received. For example, the host node provides, either as part of the request to join the mesh network or as a separate communication once the link to the resource authority has been established (e.g., in response to a request for a public key from the resource authority). In 404, the host node public key is signed. For example, the resource authority signs the host node public key using the RA certificate. In 406, a list of assets associated with the host node is received. For example, the resource authority requests a list of assets associated with or claimed by the host node of the request to join the mesh network or the list of assets is received along with the request to join the mesh network. In 408, the assets of the list of assets are added to the asset DB. For example, each of the assets of the list of assets is added to the asset DB associated with the host identifier. In 410, the asset database is distributed through the mesh network. For example, the asset database is gossiped or distributed through the network. In 412, a certificate with the host public key signed by the RA is provided to the host. For example, the certificate is then received by the host and can be used by the host to connect to the mesh network using a mutually authenticated transport layer security (TLS) connection. With the signed public key, and both the host node and the host assets added to the asset database, the host node can initiate secure RPCs with other nodes of the mesh network and it can read messages delivered to it. When other mesh nodes receive communications from the host node, they will check that the host's public key is signed by the RA to verify that the host is allowed on the mesh network and that the certificate serial numbers are not present in the signed revocation list in the asset database. Whenever an asset is added to a host node, the registration process is re-initiated. Once the asset is approved, the asset is added to the asset database associated with the host (e.g., associated with the host public key or any other appropriate host identifier) and the asset database is distributed through the mesh network using a gossip or distribution protocol.

In some embodiments, the asset database (DB) includes a signed monotonically increasing version number, which can be used to securely determine whether to use a neighbor's asset DB. For example, a host can inquire to neighbors what the version number of their asset DB is greater than the version number that they have. In response to a neighbor having a greater version number of the asset DB, the host node can cause the transfer of the asset DB from the neighbor to itself and store the higher version number asset DB in place of the current lower version asset DB currently stored in the host node.

Figure 5A:
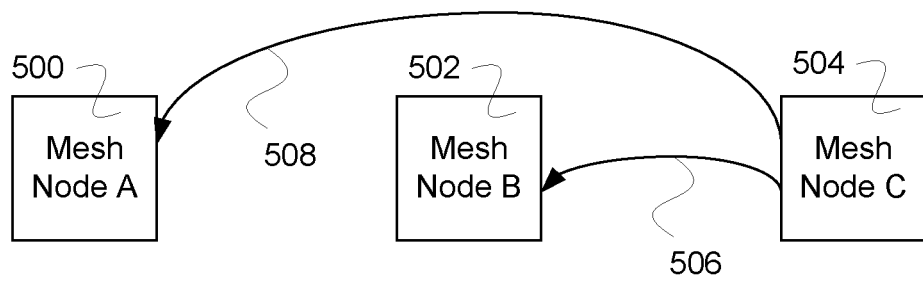
FIG. 5A is a block diagram illustrating an embodiment of mesh network communication.

FIG. 5A is a block diagram illustrating an embodiment of mesh network communication. In some embodiments, mesh nodes of FIG. 5A (e.g., mesh node A 500, mesh node B 502, and mesh node C 504) are mesh nodes of FIG. 1 (e.g., mesh node 100, mesh node 102, mesh node 104, mesh node 106, mesh node 108, mesh node 110, mesh node 112, collection sink node 114, and mesh node 116). In the example shown, mesh node C 504 sends first RPC 506 to mesh node B 502 to establish communications. Mesh node C 504 sends second RPC 508 to mesh node A 500 to establish communications.

Figure 5B:
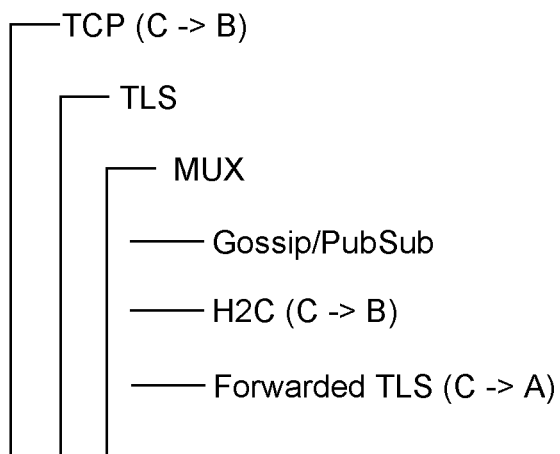
FIG. 5B is a diagram illustrating an embodiment of communication channels.

FIG. 5B is a diagram illustrating an embodiment of communication channels. In some embodiments, the communication channels illustrated in FIG. 5B are used in communication between mesh node C 504 and mesh node B 502 of FIG. 5A. In the example shown, transmission control protocol (TCP) communication is used in communicating between two mesh nodes (e.g., mesh node C->mesh node B). The communication hosts a mutually authenticated transport layer security (TLS) connection. Inside the TLS connection, a stream-oriented multiplexer runs three kinds of streams 1) Distribute or Gossip/Pub Sub traffic running a simple messaging framing protocol, 2) HC2 (HTTP/2 cleartext) for locally terminated one-hop RPC traffic, and 3) simple packet forwarding of TLS traffic to facilitate multi-hop end-to-end encrypted RPC connections (e.g., mesh node C->mesh node A communication). Headers in the multiplexer protocol contain quality of service (QoS) information and, for multi-hop RPC, headers include routing information about the intended destination. Multi-hop connections are end-to-end encrypted such that intermediate nodes cannot eavesdrop on the contents and that each end point can mutually authenticate. This is achieved by the end point nodes establishing a transport layer security advanced encryption standard Galois counter mode (TLS/AES-GCM) connection using the certificates provided by the RA. The certificates contain an RA signed hostID so that hosts cannot impersonate each other. In order to provide QoS, each host maintains a single TCP connection or a quick user datagram protocol (UDP) internet connections (QUIC) connection to its next hop peers. The TCP connection will multiplex multiple streams over the TCP connection allowing for granular prioritization at the stream level.

Figure 5C:
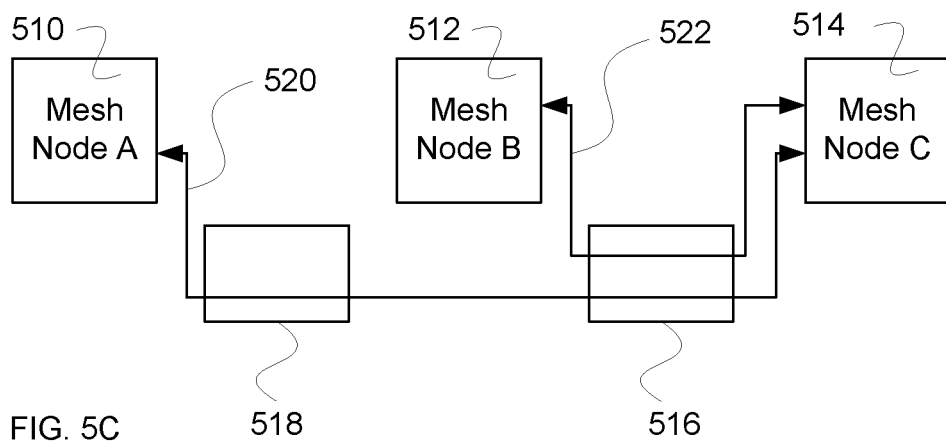
FIG. 5C is a diagram illustrating an embodiment of communication channels.

FIG. 5C is a diagram illustrating an embodiment of communication channels. In some embodiments, mesh nodes of FIG. 5C (e.g., mesh node A 510, mesh node B 512, and mesh node C 514) are mesh nodes of FIG. 1 (e.g., mesh node 100, mesh node 102, mesh node 104, mesh node 106, mesh node 108, mesh node 110, mesh node 112, collection sink node 114, and mesh node 116). In the example shown, mesh node C 514 has a TCP connection 516 to mesh node B 512. Mesh node B 512 has a TCP connection 518 to mesh node A 510. TLS connection 522 connects mesh node C 514 and mesh node B 512 for communication. TLS connection 520 connects mesh node C 514 and mesh node A 510 for communication.

In some embodiments, the RA distributes bearer tokens in the form of JSON web tokens (JWTs). Bearer tokens are a mechanism for services in the system to verify a client has permissions to do certain operations without having to synchronously check a central authority. JWTs are a set of claims in JavaScript Object Notation (JSON) format, base64 encoded, and cryptographically signed using the RA certificate. Services can validate the claims in a JWT by checking the payload signature using the RA cert. A claim comprises a resource identifier (e.g., resource/asset/abce1234) and an operation (e.g., pubsub:view) or permission. JWTs are handed out by the hub during registration and must be refreshed periodically (by exchanging the old JWT for a new one with the hub).

In some embodiments, the system uses the signed asset DB and host assertions to provide naming and addressing for the system. For example, 3e.host.local maps to hostID 3e, 5fe.asset.local maps to asset ID 5fe, and ptu.8b2.asset.local maps to trait "ptu" running on assetID 8b2.

Figure 5D:
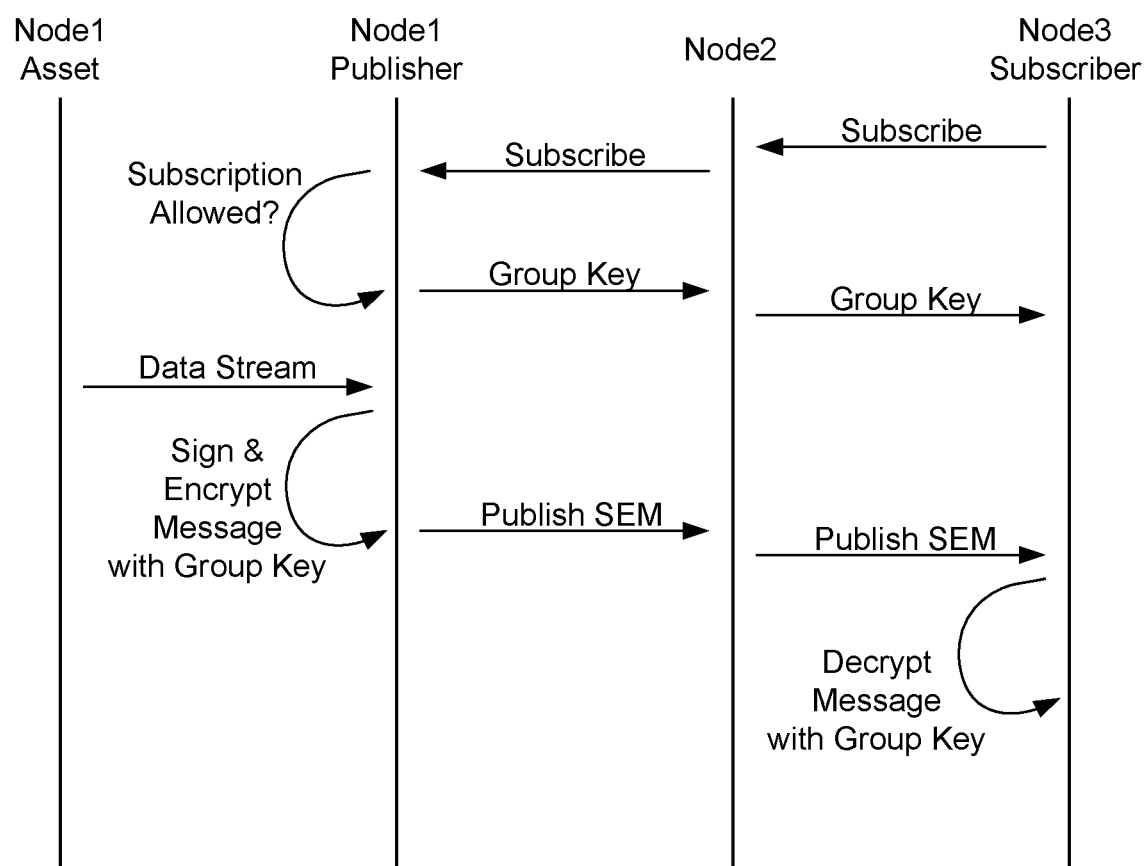
FIG. 5D is a diagram illustrating an embodiment of communication in a lattice mesh.

FIG. 5D is a diagram illustrating an embodiment of communication in a lattice mesh. In the example shown, node3 subscriber requests to a publisher that node3 desires to receive published messages from publisher. The subscription request is sent toward node1 publisher—for example, to node2 which is along a route to get to node1. Node2 receives the request and forwards along the route to node1. In some cases there are multiple nodes that relay the request along the route to the final destination of the publisher node. The node1 publisher then receives the request and determines whether the requesting subscriber, node3 publisher, is allowed to subscribe (e.g., the asset DB is queried to see if node3 subscriber is allowed to subscribe to published messages from node1, a RA is queried to see if node 3 subscriber is allowed to subscribe to published messages from node1, or any other appropriate authorizing list or authorization mechanism). In response to getting authorization, the group key is provided to node3 subscriber via node2 along a route. In the event that a data stream is received from node1 asset (e.g., a camera provides a video stream to node1), node1 publisher signs and encrypts the data stream into a message (e.g., a signed encrypted message (SEM)) using the current group key. Note that the group key is periodically updated (e.g., changed at publishing node1 as well as redistributed to subscriber nodes or provided to subscriber nodes in response to a request to subscribe or resubscribe). Node1 is provided to subscribers by publishing SEM which is relayed by node2 to node3 subscriber. Node3 subscriber decrypts the published SEM using the group key received when the node subscribed to the publisher's publish stream.

Figure 5E:
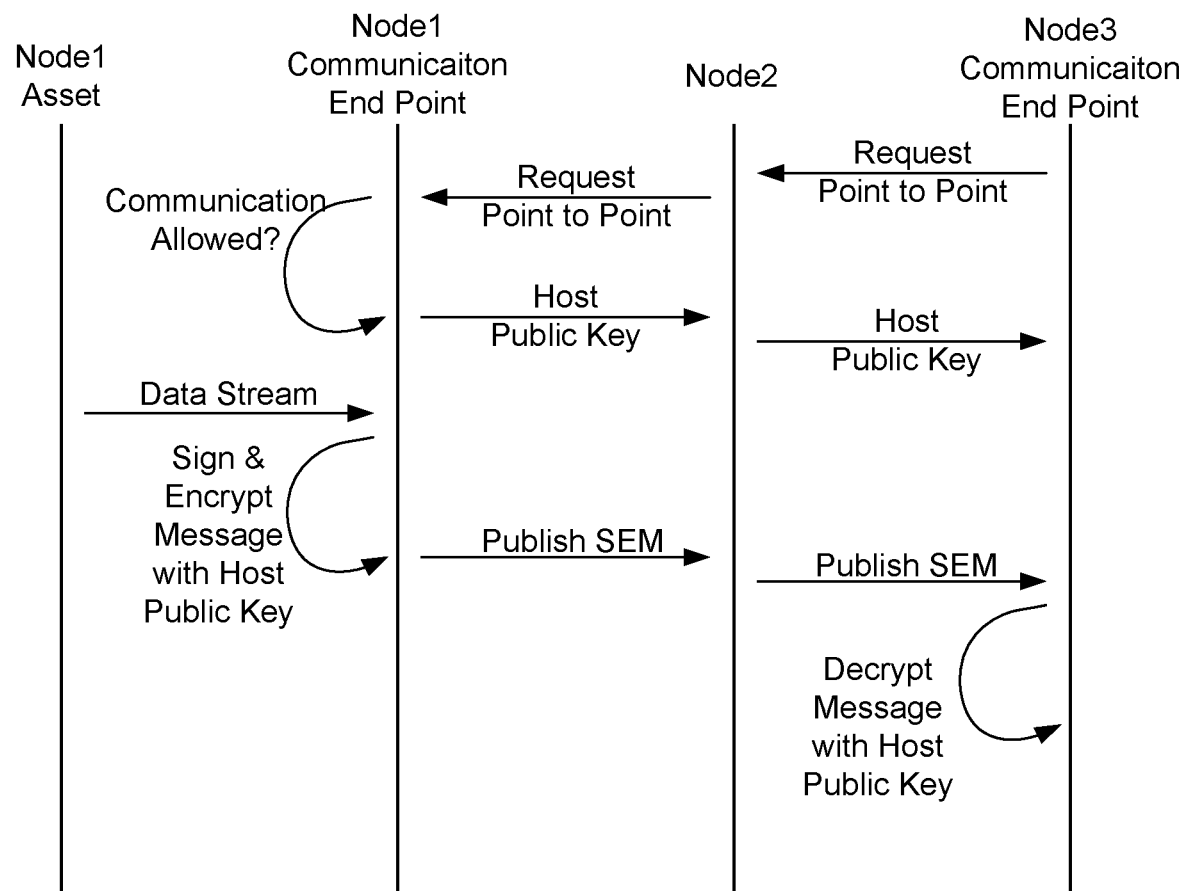
FIG. 5E is a diagram illustrating an embodiment of communication in a lattice mesh.

FIG. 5E is a diagram illustrating an embodiment of communication in a lattice mesh. In the example shown, node3 communication end point requests to a communication end point node1 that node3 desires to communicate directly between the nodes. The point to point communication request is sent toward node1—for example, to node2 which is along a route to get to node1. Node2 receives the request and forwards along the route to node1. In some cases there are multiple nodes that relay the request along the route to the final destination of the publisher node. The node1 then receives the request and determines whether the requesting node, node3, is allowed to communicate (e.g., the asset DB is queried to see if node3 is allowed to communicate with node1, a RA is queried to see if node 3 is allowed to communicate with node1, or any other appropriate authorizing list or authorization mechanism). In response to getting authorization, the host public key is provided to node3 subscriber via node2 along a route. In the event that a data stream is received from node1 asset (e.g., a camera provides a video stream to node1), node1 publisher signs and encrypts the data stream into a message (e.g., a signed encrypted message (SEM)) using the current host public key. Note that the host public key is periodically updated (e.g., changed at node1 as well as redistributed to other nodes or provided to nodes in response to a request to communicate). In some cases, the host public keys are distributed via asset DB distribution. Node1 message is provided to subscribers by publishing SEM which is relayed by node2 to node3 subscriber. Node3 decrypts published SEM using the host public key received when the node requests to communicate and/or receives a database of keys.

Figure 6:
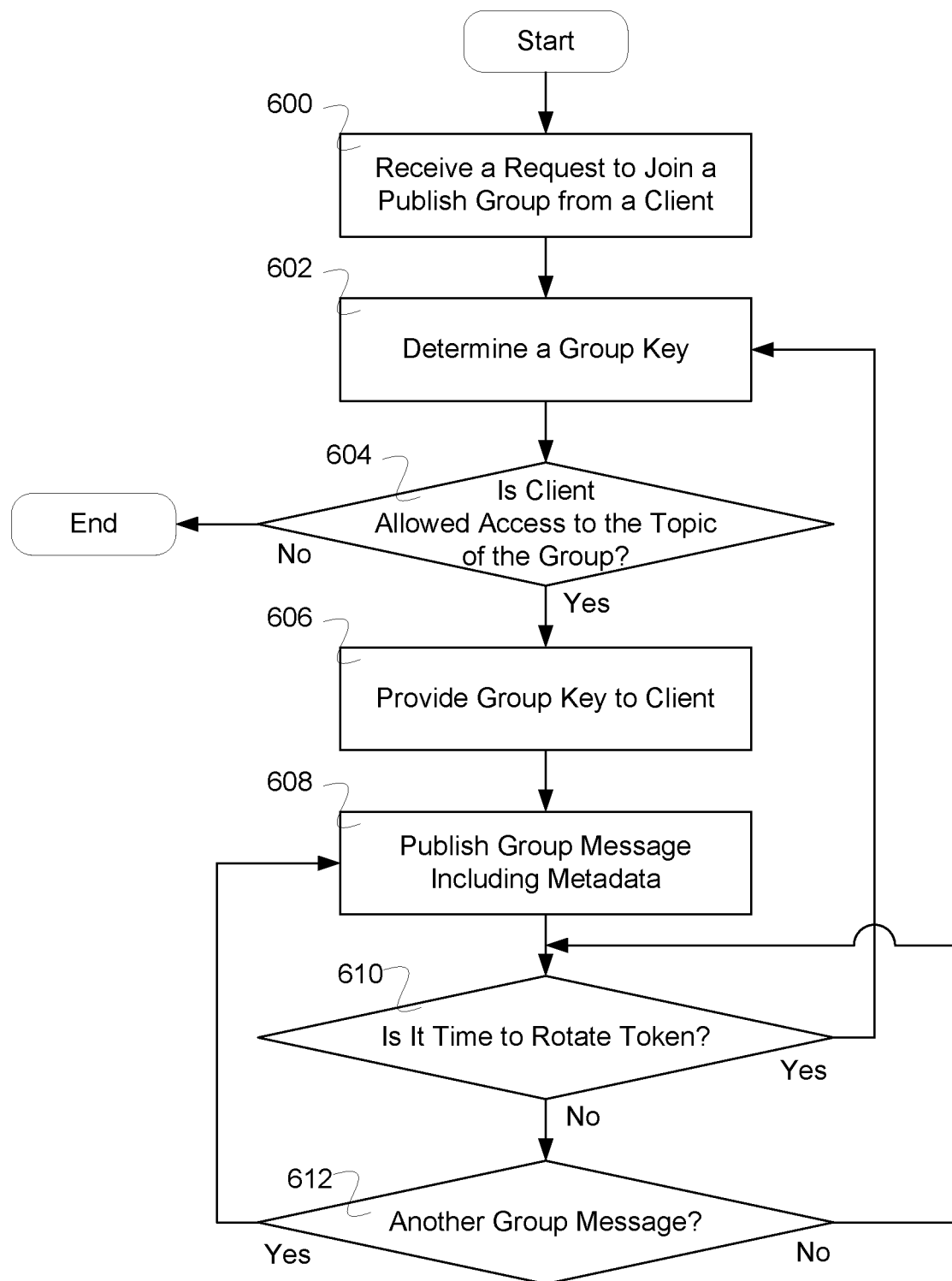
FIG. 6 is a flow diagram illustrating an embodiment of a process for publishing on a mesh network.

FIG. 6 is a flow diagram illustrating an embodiment of a process for publishing on a mesh network. In some embodiments, the process of FIG. 6 is used to publish messages through mesh nodes of FIG. 1 (e.g., mesh node 100, mesh node 102, mesh node 104, mesh node 106, mesh node 108, mesh node 110, mesh node 112, collection sink node 114, and mesh node 116). In some embodiments, to ensure that pub/sub messages are delivered using multicast (i.e., messages appear only once per edge of the graph of nodes used for their delivery) a separate stream per subscription cannot be used since this would require intermediate pub/sub nodes be able to decrypt messages bound for other nodes. In order to achieve this, each pub/sub message is individually encrypted with a group key for the topic. The group key is used to encrypt and authenticate the produced messages. To securely acquire a group key for a topic, a client pub/sub node should request one via a RPC to the server pub/sub node. The RPC specifies a keyId used to encrypt a message and bearer token that proves the client has access. The server then verifies the claim using the RA cert, and if the client is allowed access to the topic it is granted access to the group key. Group keys must have relatively short lifetimes (on the order of 10s of minutes) and be rotated regularly to ensure that revoking a node's access to a topic causes it to lose read access in a reasonable time. Group keys comprise a shared secret provided to the AES-GCM encryption mode to encrypt the message data, as well as a public key of an ephemeral keypair. AES-GCM produces a "tag" that serves as an HMAC, which is then signed by the private key of the keypair in order to provide non-repudiation properties, i.e., to prevent other hosts with access to the group key from forging messages. In some embodiments, a claim for the pub/sub service uses the resource identifier "resource/asset/${assetId}" and the permission "permission/pubsub/view".

In the example shown, in 600 a request is received to join a publish group from a client. For example, a producing node receives a request from a client or mesh node to join a publish group on a topic. In 602, a group key is determined. For example, a group key is determined by querying an asset DB for authorization that was provided initially by a RA. In 604, it is determined whether the client is allowed access to the topic of the group. For example, the RA inquires to a database whether the client or mesh node has permission or access to a given topic associated with the publish group. In response to the client not being allowed access to the topic of the group, the process ends. In response to the client being allowed access to the topic of the group, in 606 the group key is provided to the client. For example, the group key is provided to the client or mesh node to be transmitted to the client. In 608, a group message is published including metadata. For example, a group message is published using the group key that includes metadata that can be used for filtering messages appropriately at the client or mesh nodes. In 610 it is determined whether it is time to rotate the token. For example, the token should be rotated frequently to enable reasonable time response to a revocation of access privileges (e.g., in 10s of minutes, in hours, in a few seconds, or as appropriate for the network and it usage). In response to it being determined that it is time to rotate the token, control passes to 602. In response to not being determined that it is time to rotate the token, in 612 it is determined whether there is another group message. In response to their being another group message, control passes to 608. In response to their not being another group message, control passes to 610.

In some embodiments, pub/sub claims are at the asset-level and allow a bearer to read all topics that the asset produces.

In some embodiments, an asset may wish to subscribe to a subset of messages from a topic (e.g., a drone may be commanded to follow a track from a tower). To allow for this, each message exposes unencrypted metadata which can be used for filtering. When a subscription is started, it can specify a set of filters to apply to messages. The metadata is a map of keys to a set of values, and the filters allow exact match or prefix match on the keys. Using this scheme, basic geo-filtering using geo-hashes is possible. Metadata associated with a message can include a unique key (e.g., a key associated with a producer of the message, a key that is associated with a time/date stamp, etc.), a media type (e.g., a protobuf, a blob, a file type—for example, video file (moving picture experts group (MPEG), MP4 (MPEG-4), etc.), a text file, an image file, a pdf file, etc.), and/or a timestamp. For image based messages, the pub/sub message should be able to encode the images as chunked MPEG streams for efficient transport and storage.

In some embodiments, each host produces a signed assertion list of assets (signed by RA and host) and traits (signed only by host). A trait is a string that describes a grouping of RPC services and topics produced. In the host assertion list, the host can also include a list of string metadata tags that can be used for discovery purposes by the rest of the system. When publishing a message, an asset includes the topic name as well as a list of per-message metadata tags. The topic metadata tags can contain information useful for filtering. Intermediate nodes involved in routing multiple subscriptions can use prefix matching to combine duplicated subscriptions. In some embodiments, homomorphic encryption is used to encrypt and perform prefix matching on tags to remove the ability of intermediate routing nodes of being able to eavesdrop on the filtering metadata.

In some embodiments, a pub/sub service is able to publish messages to a topic, where a topic is a tuple of (topicID, assetID). In some embodiments, a pub/sub service is able to subscribe to messages for any topic when the pub/sub service specifies the topic (topicID, assetID) tuple, the delivery type (e.g., complete/backfilled, most recent, last message, etc.), and the point in time to start from (e.g., 0 starts from the beginning of the stream, −1 starts from "now", a specified time will start the messages from the specified time, etc.). In some embodiments, a pub/sub service is able to unsubscribe to messages for any topic (e.g., also specified using the tuple topicID, assetID).

In some embodiments, a pub/sub service stores data in order to be able to answer history queries (e.g., start sending or publishing the stream from a time in the past). In some embodiments, a hub node stores all data in a database. In some embodiments, other nodes in the system store a cache of the data (e.g., in a permanent memory such as a hard drive).

Figure 7:
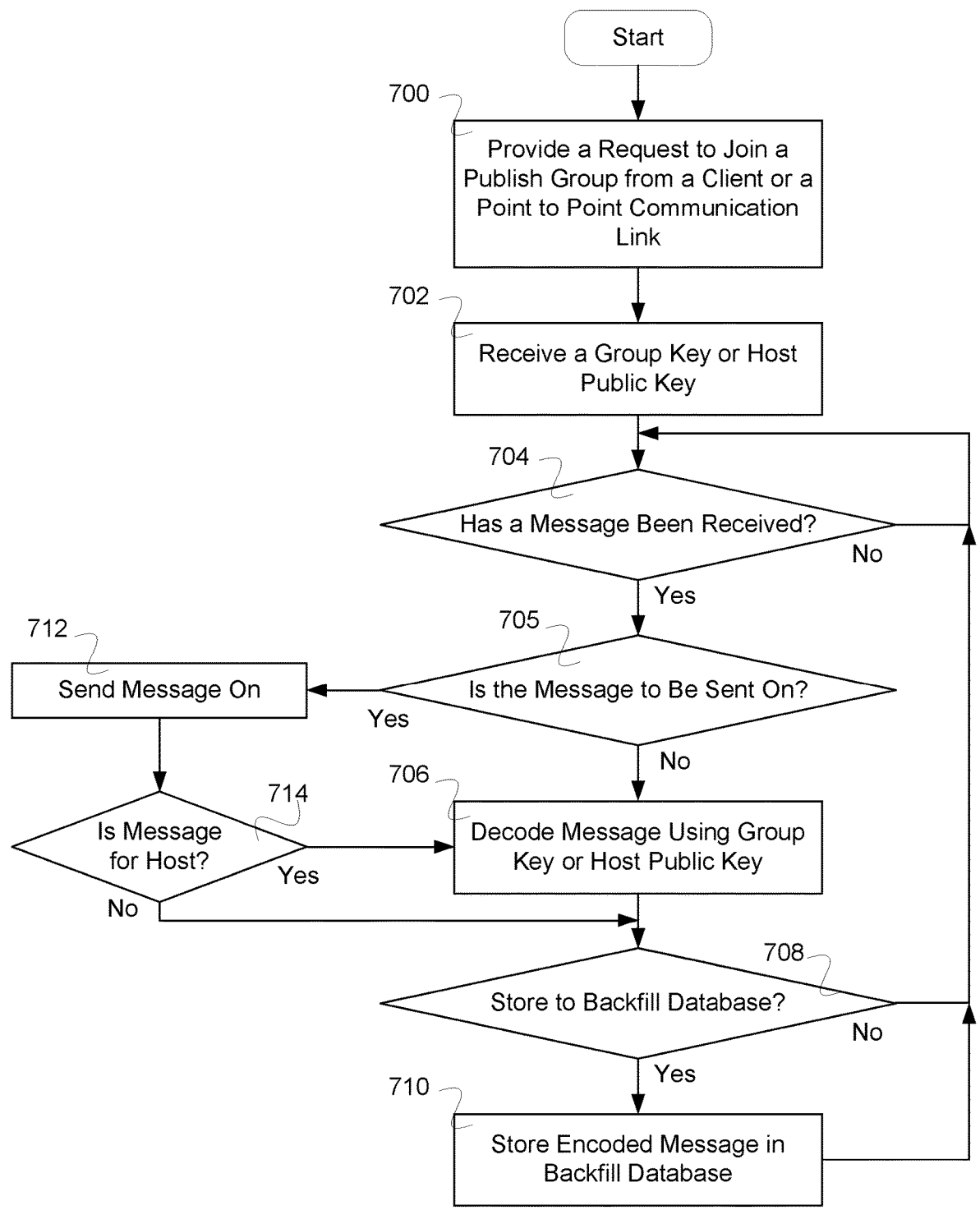
FIG. 7 is a flow diagram illustrating an embodiment of a process for receiving messages.

FIG. 7 is a flow diagram illustrating an embodiment of a process for receiving messages. In some embodiments, the process of FIG. 7 is used to receive a private message or a published group message. In the example shown, in 700 a request is provided to join a publish group from a client or a point to point communication link. For example, provide a request to join a publish group from a client or a point to point communication link to an asset database. In 702, a group key or a host public key is received. For example, a group key is received from an asset database. In 704, it is determined whether a message has been received. In response to a determination that a message has not been received, control passes to 704. In response to a determination that a message has been received, in 705 it is determined whether the message is to be sent on. In response to the message being determined to be sent on, in 712 the message is sent on and in 714 it is determined whether the message is for the host. In response to the message being for the host, control passes to 706. In response to the message not being for the host, control passes to 708. In response to the message being determined not to be sent on, control passes to 706. In 706, the message is decoded using the group key. In 708, it is determined whether to store the message in a backfill database. For example, in the event that the node is a collection sink node, the message is stored to a backfilled database. In some embodiments, the node does not have a backfill database and control passes from 706 to 704 after decoding the message. In response to a determination to store to a backfill database, in 710 the encoded message is stored in a backfill database and control passes to 704. In response to a determination not to store to a backfill database, control passes to 704. In the case of a regular node, the group key or host public key is stored in memory and not in a permanent memory so that in the event that the permanent memory is compromised, encoded messages cannot be decoded with a stored key. In some cases, a node comprises a data sink. Data sinks are selected because the data sink is considered as secure.

Figure 8:
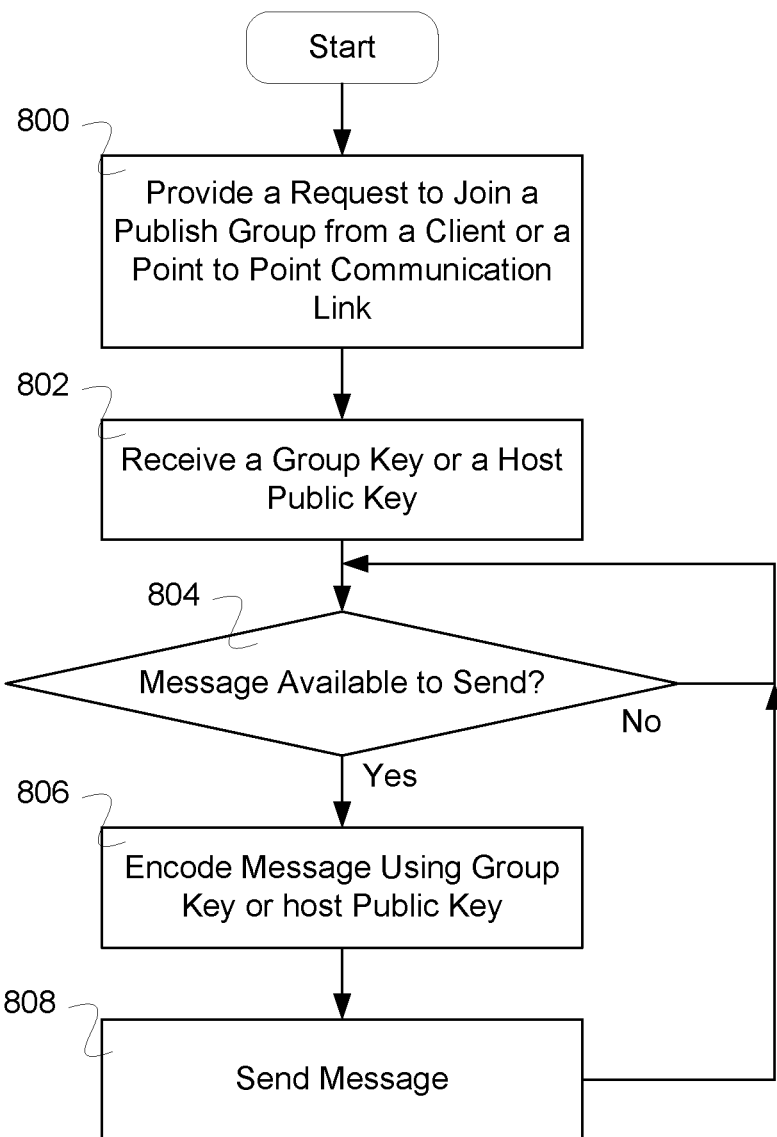
FIG. 8 is a flow diagram illustrating an embodiment of a process for transmitting messages.

FIG. 8 is a flow diagram illustrating an embodiment of a process for transmitting messages. In some embodiments, the process of FIG. 8 is used to send a private message or a published group message. In the example shown, in 800 a request is provided to join a publish group from a client or a point to point communication link. For example, provide a request to join a publish group from a client or a point to point communication link to an asset database. In 802, a group key or a host public key is received. For example, a group key or a host public key is received from an asset database. In 804, it is determined whether a message is available to send. In response to a determination that a message is not available to send, control passes to 804. In response to a determination that a message is available to send, in 806 the message is encoded using the group key or a host public key. For example, the message is either encrypted using a group key or signed using a host public key. The important distinction to note between the group key and the host public key is that the group key is a symmetric key used to encrypt/decrypt messages and that it is periodically rotated. The host public keys are asymmetric keys that are stored on hardware-security modules and are never rotated (a given host is assigned a single host public key at manufacture time). The host public keys are used to sign messages that a host issues so that other nodes that have access to the group key (which they get access to when they wish to read messages) cannot forge messages. In 808, the message is sent and control passes to 804. For example, the message is sent along a routing route to a destination or published to the network. Note, only a producing node can publish to the publish group.

In some embodiments, the system is designed to provide security such that an attacker is not able to gain access to other components in the event that a single node has been compromised. In some embodiments, the system does not enable a node to read messages/RPCs destined for other nodes that are being routed through the node. In some embodiments, the system does not enable a node to undetectably modify messages/RPCs destined for other nodes that are being routed through another node. In some embodiments, the system does not enable redirecting messages/RPCs destined for other nodes to any given node (i.e., affect a routing table entry).

In some embodiments, the system allows a node to deny service for any messages/RPCs passing through it even if they are destined for other nodes. In some embodiments, the system allows a node to intercept messages/RPCs destined for the node. In some embodiments, the system allows a node to send messages impersonating as the node. In some embodiments, the system allows a node to subscribe to messages that the node be able to see. In some embodiments, the system allows the node to inspect the destinations of all messages/RPCs that pass through it.

In some embodiments, the keys use Elliptic Curve Digital Signature Algorithm (ECDSA) on the National Institute of Standards and Technology (NIST) P-256 curve which has a compressed public key size of 33 bytes and a signature size of 64 bytes.

In some embodiments, the RA has a key pair and each host pins the RA public key, where the pinned key is only changeable with physical access to the host. In some embodiments, each host has a hardware-based key pair assigned at manufacturing time that cannot be changed unless hardware modifications are made. Hosts are identified using their public key, which is also known as its host identifier.

In some embodiments, the RA maintains a centralized list of authorized member host IDs. This list is updated through the registration process and distributed through the network. In the event that a host becomes evil (e.g., an indication is received that the host is compromised), the RA can revoke the active certificates issued for that host. The serial numbers of the revoked certificates are included in the signed host list until the certificate's expiration time has been reached. Each host advertises assertions about other hosts that the host can reach with an expiration time. The assertions are signed by the host's private key. An edge for which there exists one signed assertion is called a "candidate edge". An edge with two reciprocal assertions is called a "routable edge". Only routable edges are active in the network.

In some embodiments, the architecture is designed to limit the damage that an evil node can cause. For example, evil nodes can create as many candidate edges as they would like; however, if other good hosts cannot reach the evil node, then the good node will not create assertions for the evil node's candidate edges and no routable edges will be created. Thus, an evil node is limited to creating edges with good nodes that the node can reach.

In some embodiments, routes in the lattice mesh network are created by signed assertions of mutual reachability. For a link to be created in the routing table, each side of the link must agree, and each side must be signed. Once a link is established, it is stored locally in a routing table. The damage to a routing table that an evil node is able to inflict is limited to nodes that the evil node can actually reach directly. The idea is that the evil node can't, for example, advertise that it's connected directly to every node in the network and then drop all the packets, thus destroying the network. Note that if a node is compromised then the attacker may still compromise the applications that are running on the node. However, these attacks may be protected against using standard operating system best-practices (such as ensuring that applications are running as users following the principle of least privilege).

In some embodiments, a routing table with a routable edge comprises:
T2->T1
T2->T3
T1->T2
The link between T1 and T2 is a routable edge since both T1 and T2 have signed assertions of mutually reachability. T3 is a candidate edge. The routing table includes entries of the order of number of edges in the network rather than entries of the order of the number of hosts as traditional routing tables have In some embodiments, backfill is used to refer to the process of logging data locally on a node so that historical data is available. This historical data is shifted around the network so that the historical data is accessible locally to other nodes. The backfill should have no or low impact on the pub/sub system. Live data is the priority of the system and backfill is operated using the left over bandwidth after all live pub/sub subscriptions are handled. Data shifted of a node onto another node is stored on the node in the event that a node is compromised. In the event that a node B has been granted access to a node A and has stored the data encrypted on disk then the key that node B uses to decrypt the data from A is time bounded. The key is stored in memory (e.g., not stored in non-ephemeral storage). This ensures that in the event that an attacker compromises node B that the attacker will only be able to see a time-bounded window of historic data. The backfilled data is delivered using the pub/sub multicast delivery mechanism. In the event that multiple nodes are interested in backfilled data then the data only needs to be transmitted along each edge between nodes once. The data delivered through the live pub/sub is also stored by intermediate nodes eliminating the need to retransmit data for backfill purposes since the data has already been transmitted for live pub/sub purposes. Historic data stored on devices are not readable by an attacker that gains control of any given node.

In some embodiments, a dispatch server uses backfilling to recover data from a node that was generated during periods of poor or no network connectivity so that the data is eventually available to users. In some embodiments, there are one or more dispatch servers operating on a network and some of the dispatch servers are deployed towards the edge of the network and may be compromisable.

In some embodiments, a global tracker refines all the routes globally using network connectivity and quality of service data. The global tracker is able to perform track fusion (e.g., combining two separate tracks into one) in the face of unreliable network routes.

In some embodiments, backfill traffic is routed over the network as RPC stream with a lower priority that pub/sub. The data that the RPC backfill service serves up is the same data that flows through the live pub/sub network (e.g., signed encrypted messages that are encrypted using group keys. This enables intermediate nodes to store the live pub/sub data and use it to serve backfill data requests. Nodes can answer backfill service RPCs on behalf of other nodes, rather than requiring a secure RPC tunnel to the producer, since the data is encrypted and signed using group keys.

In some embodiments, the RA defines a set of "collection sinks" which are hosts in the network that need access to backfilled data. The RA assigns each node a set of collection sinks in the HostList (which it then signs). All nodes store historic Group Keys encrypted at-rest with their assigned collection sink public keys using PGP (where each collection sink is a recipient), or similar scheme. The PGP-encrypted Group Keys are then made available through the Backfill Service to all nodes.

In some embodiments, in order to ensure a reasonable throughput when nodes use hardware storage modules, when a collection sink registers with the RA, it can generate a separate collection sink public/private key pair and store the private key portion on disk, encrypted at-rest using the device private key (which stored in an hardware storage module). When the collection sink registers with the RA, it provides the collection sink public key. This public key can then be listed in the HostList as the public key of the collection sink. On start-up, the collection sink can unencrypt the collection sink private key, store this in memory, and use this to unencrypt the Group Keys to access the backfilled data.

In some embodiments, historic data stored on a captured device is inaccessible to an attacker unless the attacker has also compromised a collection sink to which the device is assigned. The attacker is still able to read the current group keys from RAM, but the attacker is limited to seeing data produced since the group key was last rotated. In some embodiments, the original device is not required to be accessible in order to access the backfilled data, it just requires access to one of the collection sinks' private keys. This is because intermediate nodes are able to cache the encrypted group keys as well as the encrypted messages. In some embodiments, the collection sinks have to be defined ahead of time, which means that when a collection sink is added it will not be able to backfill data, since producer nodes will not have had it in their PGP recipients list. In some embodiments, the RA needs to be able to keep track of collection sinks and assigns them to hosts and maintains the key pairs for the collection sinks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a lattice mesh, comprising:
   an interface configured to receive a request to register from a host, wherein the request to register includes a key and a set of asset IDs that the host wishes to claim;
   a processor configured to;
      sign the key to generate an Resource Authority (RA) certificate signed key with an RA certificate;
      update an asset database with the RA certificate signed key;
      distribute the RA certificate signed key through the network; and
      provide the host with the RA certificate signed key.

2. The system as in claim 1, wherein a message is encoded using a group key or a host public key in the asset database, wherein encoding the message comprises encrypting the message using the group key or signing the message using the host public key.

3. The system as in claim 2, wherein the message is sent to another node or published to multiple nodes after encoding.

4. The system as in claim 1, wherein a message is decoded using a group key or a host public key in the asset database.

5. The system as in claim 4, wherein the message was sent specifically to one node or published to multiple nodes.

6. The system as in claim 1, wherein the interface and the processor belong to a hub.

7. The system as in claim 6, wherein the hub includes a resource authority.

8. The system as in claim 7, wherein the resource authority includes a certificate authority.

9. The system as in claim 7, wherein the resource authority includes a key store.

10. The system as in claim 9, wherein the key store stores keys in a hardware security module.

11. The system as in claim 7, wherein the resource authority includes an asset database.

12. The system as in claim 7, wherein the resource authority includes a host to claim map.

13. The system as in claim 7, wherein the resource authority includes an asset database sharer.

14. The system as in claim 1, wherein the host includes a host service.

15. The system as in claim 14, wherein the host service includes a registration requestor.

16. The system as in claim 14, wherein the host service includes a key store.

17. The system as in claim 16, wherein the key store stores keys in a hardware security module.

18. The system as in claim 14, wherein the host service includes an asset database.

19. The system as in claim 14, wherein the host service includes an asset database sharer.

20. A method for a lattice mesh, comprising:
    receiving a request to register from a host, wherein the request to register includes a host public key and a set of asset IDs that the host wishes to claim;
    signing, using a processor, the key to generate an RA certificate signed key with an RA certificate;
    updating an asset database with the RA certificate signed key;
    distributing the RA certificate signed key through the network; and
    providing the host with the RA certificate signed key.

21. A computer program product for a lattice mesh, the computer program product being embodied in a tangible computer readable storage medium and comprising computer instructions for:
    receiving a request to register from a host, wherein the request to register includes a key and a set of asset IDs that the host wishes to claim;
    signing the key to generate an RA certificate signed key with an RA certificate;
    updating an asset database with the RA certificate signed key;
    distributing the RA certificate signed key through the network; and
    providing the host with the RA certificate signed key.

* * * * *